United States Patent [19]
Casapulla

[11] Patent Number: 5,396,838
[45] Date of Patent: Mar. 14, 1995

[54] CAN LIQUID EXTRACTOR WITH CAN INVERTING MEANS

[76] Inventor: Joseph A. Casapulla, 447 Valley Brook Dr., Hockessin, Del. 19707

[21] Appl. No.: 177,269

[22] Filed: Jan. 4, 1994

[51] Int. Cl.$^6$ .............................................. B30B 9/04
[52] U.S. Cl. ..................................... 100/116; 99/495; 100/266; 100/283
[58] Field of Search ................. 100/37, 110, 116, 132, 100/134, 135, 233, 266, 283; 99/495, 506–508, 644; 141/121–124; 414/419

[56] References Cited

U.S. PATENT DOCUMENTS

| | | | |
|---|---|---|---|
| 1,760,205 | 5/1930 | Muller | 141/124 X |
| 3,995,544 | 12/1976 | Farley | 100/116 |
| 4,355,574 | 10/1982 | Bond et al. | 100/116 X |
| 4,498,385 | 2/1985 | Manley | 100/233 |
| 4,890,552 | 1/1990 | Yelczyn | 100/233 |

FOREIGN PATENT DOCUMENTS 1509030  9/1989  U.S.S.R. .............................. 99/495

*Primary Examiner*—Stephen F. Gerrity
*Attorney, Agent, or Firm*—Connolly and Hutz

[57] ABSTRACT

A can liquid extractor for removing liquid from a pre-opened cylindrical can containing solids packed in a liquid medium, comprising a can support base having engaging elements which retain the can and lid in place, an inverting apparatus which allows a can to be inverted while retaining the can and its lid in place, and a compression apparatus comprising a handle, pivotable compression arm, and ram assembly for exerting force upon the lid and can held in static relation, whereby water is expelled from the can interior around the edge of the lid.

18 Claims, 2 Drawing Sheets

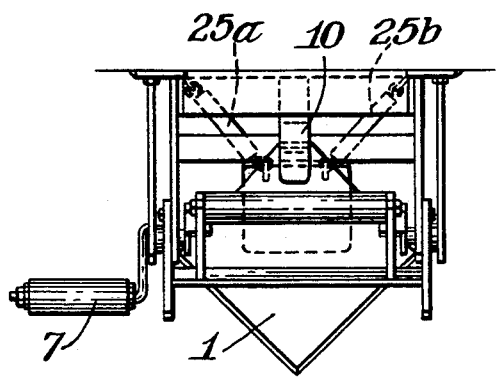
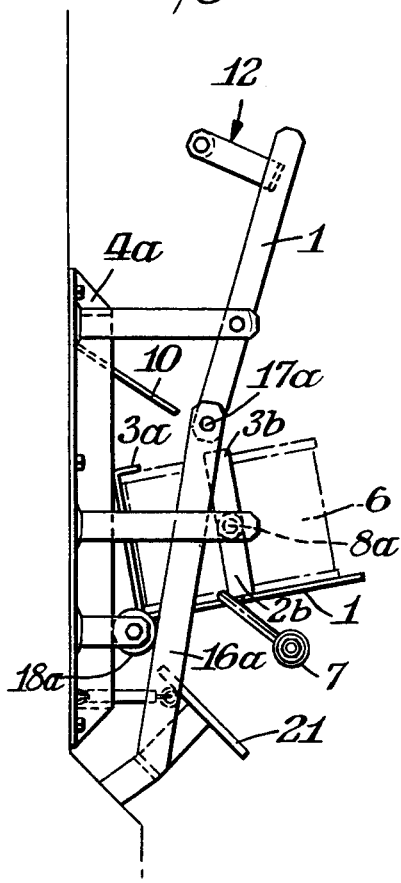
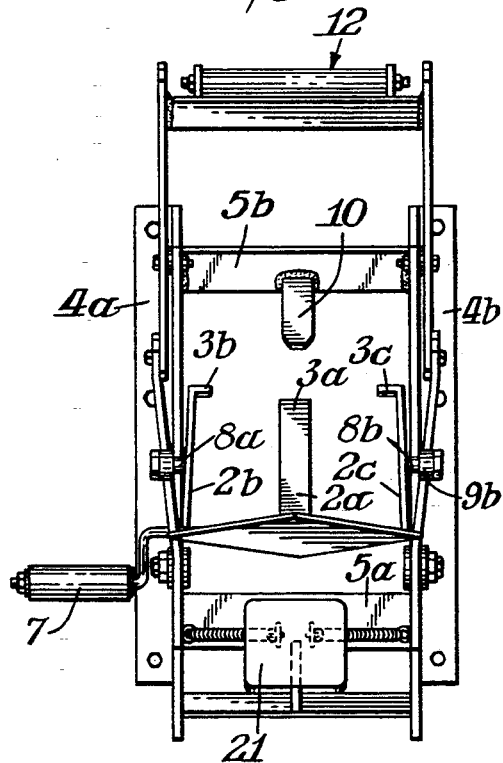

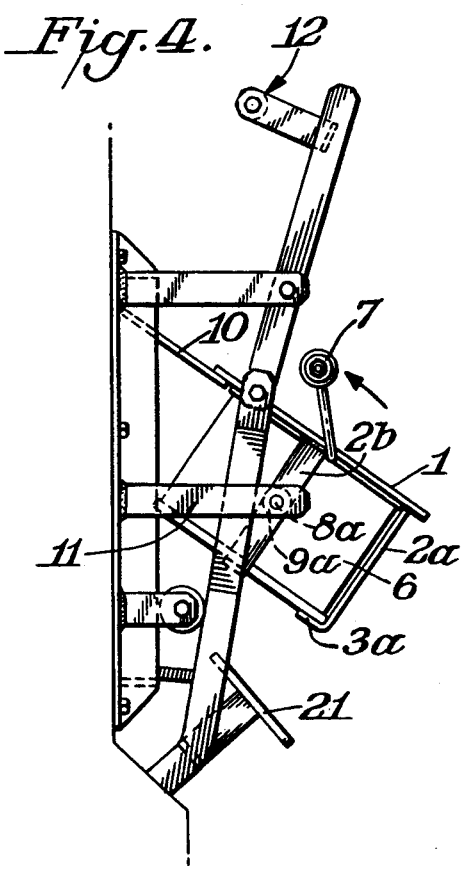
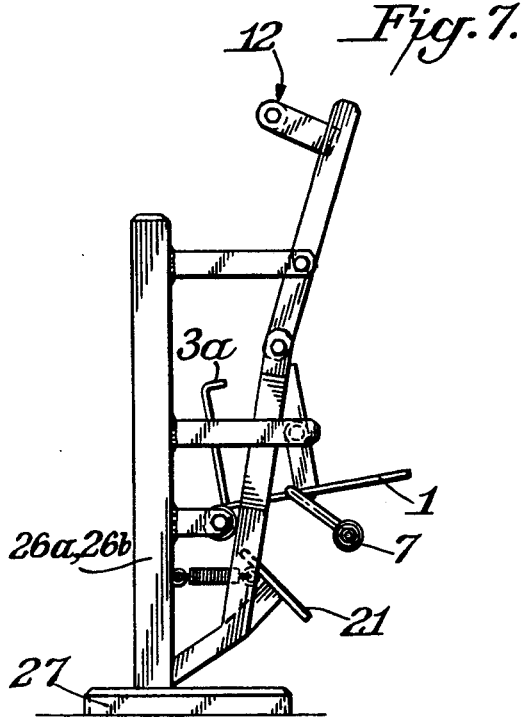
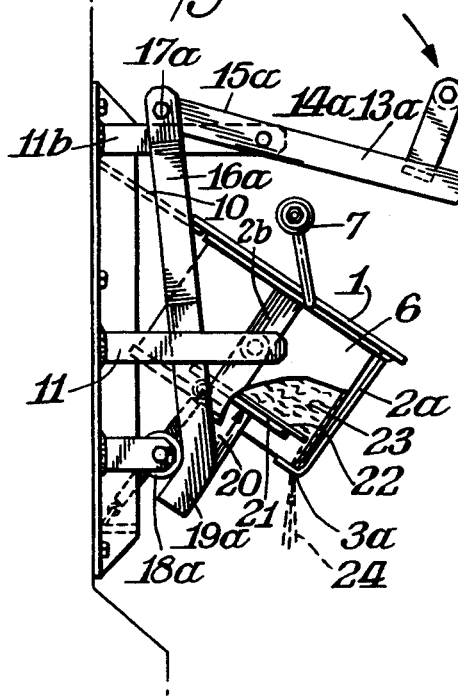
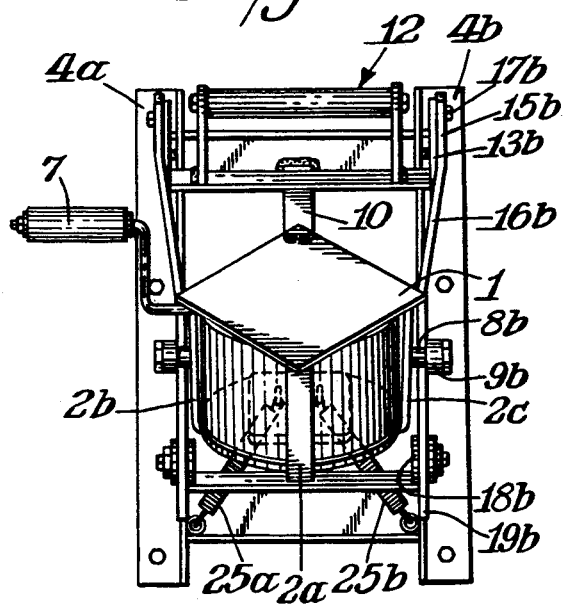

CAN LIQUID EXTRACTOR WITH CAN INVERTING MEANS

BACKGROUND OF THE INVENTION

1. Field of the Invention

The present invention relates to a free-standing, wall-mountable, or countertop press for removing liquids from canned goods, and a method of draining liquid from canned goods.

2. Description of the Prior Art

At present, there are many items which are shipped contained in a liquid medium in cans. Before use, these items must be drained sufficiently so that excess liquid is not present in the item removed from the can.

Among the items shipped in cans are foodstuffs—examples are tuna or other fish in water or oil, vegetables in water, mushrooms in water, pickles, pineapples, apples, tomatoes, and others. However, other non-foodstuffs are often shipped suspended in fluids. For example, high-performance machined parts are often shipped or stored suspended in oil to prevent corrosion and abrasion, and gasket materials are often suspended in lubricants to prevent their drying out or cracking upon extended storage.

There are many various can sizes and shapes in use today, and due to inexpensive storage, packaging, handling and processing, cans will continue to be used in the future. Cans are generally metallic, although rigid plastics are sometimes used, and the cans are formed having a cylindrical sidewall, and circular top and bottom joined by seams. These cans are opened, generally, by can openers known in the art, which utilize a blade to pierce the lid or bottom of the can at its periphery. The blade then is moved in a complete circle about the circumference of the can until a complete circular cut is made, freeing the lid from the body of the can. The cut provides a sufficient opening between the wall of the can and the edge of the lid through which water may be drained while the solids are maintained inside the can with minimal or no losses.

However, items which are shipped canned and suspended in a liquid are frequently difficult to handle due to the volume of liquid and the can having a consequentially heavier weight than goods shipped in a dry state. Businesses which use large amounts of canned goods frequently are forced to cope with the inconvenience of draining larger sized cans in quantity. Persons without sufficient physical strength often find it difficult to pick up and physically manipulate such cans.

One specific example of a medium-sized industrial use can is commercial chunk tuna packed in water. Generally marketed for food service use, the commercial tuna may come in metal cans approximately 12 cm in diameter, and 13 cm tall. The approximate weight of such a can is 8 pounds. Such a can may be bulky, heavy, and inconvenient to handle, especially if large quantities of the cans are used.

Heretofore, one faced with the task of draining a can unaided, would after opening the can, be forced to invert the can and press the loose lid up with a hand or finger to expel water from the can interior. In some instances, the force which is required to drain water from the can can be quite large—more than that which can be comfortably exerted.

Additionally, the can must be held over a sink, bucket or other receptacle, in such a manner that the water drains out and is captured for disposal, recycling, or re-use. This results in an awkward arrangement, whereby large amounts of force required to be exerted while holding a heavy object at arms length. Furthermore, the lid must be held in such a static position relative to the can body that the entrapped items are not released. Repetitive, awkward, and physically difficult actions such as this often may be a cause of physical injury in the workplace, and there is a need for a device which can make this repetitive chore more easily performed.

An example of one utensil which has been suggested to aid in the can-draining endeavor, U.S. Pat. No. 3,995,544 discloses a cup which may be inserted into a can. The lid is removed from the can, and the cup, which has holes in the bottom, is inserted into the can. The assembly of cup with can is picked up inverted, and placed on a flat surface. Force may then be exerted onto the can, draining water through the holes in the cup. This arrangement, while useful, can suffer from clogging, and the implement may need to be frequently cleaned during use. Additionally, the implement must be stored, thereby taking up space, and cleaned before each use. The amount of force is limited to that which may be physically exerted by the individual pushing down on the can.

U.S. Pat. No. 4,860,647 discloses a different can-draining implement. It comprises a pair of holes joined about a pivot point. A can is opened, the lid left is place, and inserted in between two disc-like plates. The handles may then be squeezed and water drained by holding the device over a sink.

While the above-noted instrument may aid in can draining, it does not aid in manipulating the cans, which can be heavy, or providing means for applying force by a convenient manner and direction.

SUMMARY OF THE INVENTION

To overcome the problems involved in handling cans filled with liquid, this invention comprises a wall-mounted, free-standing, or countertop device which will assist a user in inverting a can and exerting force to expel fluids from the can. The device comprises a can support means, an inverting means, and a compression means.

In the presently preferred form, the can support means comprises a can support plate with can engaging elements. The can engaging elements are perpendicular to the can support plate, and are as long as a can to be drained is tall. The can engaging elements have an upper terminal portion which runs parallel to the can support plate. These portions, or lips, retain the can and lid in place on the can support plate.

In its presently preferred form, the inverting means comprises a pivot for rotating the can support plate. As previously discussed, the can support plate has affixed to it perpendicular can engaging elements which retain the can and lid in position. At least one of the can engaging elements on one side of the can support plate is formed with an axle. This axle pivotably engages a circular axle receptacle on a pivot support bracket. A inverter handle may be provided to conveniently effect inversion. In an alternative embodiment, the axle may comprise a single bolt attached to a support bracket. The can support plate then may be pivotably mounted directly to the bolt.

The compression means, in its presently preferred form, comprises a grasping means (in the presently preferred embodiment a compression handle) mated to compression arms, which are pivotably mounted about pivot points on an upper support bracket, and pivotably engaged to ram arms by pivot points. The ram arms are formed connected to a transverse bar, which supports a ram support and ram.

In operation of a preferred embodiment of the invention, the compression handle is pushed downward by an operator. This causes the compression arms to pivot about their pivot points on the upper support bracket, and the "working" end of the compression arm (across the pivot point) to be drawn in an upward direction. The upwardly moving compression arm, pivotably mated to the ram arms, draws the ram arms, transverse support bar, ram support and ram in an upward direction. The guide rollers direct the travel. This action exerts force against the can lid, and through the can lid against the solids entrapped behind the can lid in the interior of the can. Varying amounts of pressure may be applied by an operator. This will remove varying amounts of water from the solids entrapped within the cans interior. For example, less pressure exerted on the compression handle will give a wetter product than more force exerted on the compression handle. Thus, the amount of pressure exerted will yield varyingly dried materials. This is important where the texture and water content of the solids will effect their end use.

The moving pivot points of the present invention may be formed from machine bolts, cotter pins, or rivets inserted through holes formed in the elements of the invention, or other means known in the art for engaging members formed with holes in a pivotable relationship.

BRIEF DESCRIPTION OF THE DRAWINGS

FIG. 1 is a front elevational view of an embodiment of the present invention which is wall mounted.

FIG. 2 is a side elevational view of the embodiment shown in FIG. 1, showing in phantom a can inserted into the can holder.

FIG. 3 is a top plan view of the embodiment shown in FIGS. 1 and 2.

FIG. 4 is a side elevational view of an embodiment of the invention, with a can inverted for liquid extraction.

FIG. 5 is a side elevational view of an embodiment of the invention showing compression of the can contents to effect liquid extraction.

FIG. 6 is a front elevational view of the embodiment shown in FIG. 1, with a can inserted and inverted for liquid extraction. The compression handle has been pulled down to effect liquid extraction.

FIG. 7 is a side elevational view of an alternate embodiment of the invention having a free-standing pedestal for counter use.

DETAILED DESCRIPTION OF THE DRAWINGS

Turning now to the drawings, there is shown in FIG. 1 a preferred embodiment of the liquid extraction device. This embodiment shows can support plate 1 with three perpendicular can engaging elements 2(a), 2(b), and 2(c). In alternative embodiments, there may be one long element, or multiple narrower elements. Each of the engaging elements is equipped with a terminal portion parallel to the can support plate (also called a "lip" hereinafter) 3(a), 3(b), 3(c), which retain the can and lid when in an inverted position. The can engaging elements may be removable or permanent, and are dimensionally designed in length to match the height (vertical direction) of the can to be drained of fluid. The can engaging element may, in an alternative embodiment, be one long, lipped element substantially matched to the curvature and height of the can to be drained.

This particular embodiment is affixed to the wall by wall mount brackets 4(a) and 4(b) which are joined by crossbars 5(a) and 5(b).

Turning to FIG. 2, which is a side elevational view, can 6 is placed upon the can support plate 1, and engaged by can engaging elements 2(a–c) and lips 3(a–c). Can engaging element 2(c) and lip 3(c), which are behind the can, are not shown in this Figure.

The arrow in FIG. 4 demonstrates the direction of travel for inverting a can. The can 6 is inverted by grasping handle 7 and rotating the can support means to invert the can. Can engaging elements 2(b) and 2(c) have axles 8(a,b) which are pivotably mounted in circular axle receptacles 9(a,b), enabling the entire can support means to be inverted by rotation in the direction of the arrow. Can engaging element 2(c) and axle 8(b) are not shown in FIG. 4. The rotation is stopped when a leading edge or corner of can support plate 1 strikes stop member 10. The can support means and pivot are supported by pivot support bracket 11 which is mounted to the wall mounting brackets.

FIG. 5 reflects the present invention in a "compressed" state, i.e. compressive force is exerted upon the compression handle. Compression handle 12 is drawn in a downward direction by the user. Compression handle 12 is mated to compression arms 13(a,b) which are pivotably mounted about compression arm pivot points 14(a,b) on upper support bracket 11(b). Varying amounts of mechanical advantage may be obtained by adjusting the compression arm pivot points 14(a,b) along the length of compression arms 13(a,b) in preferred embodiments. Compression arm 13(b), compression arm pivot point 14(b), which are behind their counterparts, are not shown in FIG. 5.

As compression handle 12 is drawn downward, compression arms 13(a,b) pivot, and the working ends 15(a,b) of the compression arms, which are pivotably engaged to ram arms 16(a,b) about mating pivots 17(a,b). Ram arms 16(a,b) are drawn upward, and are held in place by guide rollers 18(a,b). Working end 15(b), mating pivot 17(b), ram arm 16(b), and guide roller 18(b) are not shown in FIG. 5.

As the ram arms travel upward, terminal portions 19(a,b) mark the limit of travel for the ram arm along the guide rollers 18(a,b) which align the ram arms. Ram support arm 20 is drawn upward and ram 21 exerts force against can lid 22. Can lid 22 keeps the solid material in place in can 6, allowing liquid (shown by dashed lines) 24 to drain out of the can 6 while holding solid material 23 in the can interior.

Turning now to FIG. 6, it may be seen that springs 25(a,b) are extended by the upward motion of ram 21. Upon the user's release of compression handle 12, the springs draw ram 21 downward, which causes the mechanism to return to the starting position of FIG. 4. The handle 7 may be rotated back to its starting position, and the can 7, now drained, may be removed and the material inside is ready for use.

FIG. 7 shows an alternative embodiment of a device according to the present invention. Vertical support posts 26(a,b) replace wall brackets 4(a,b), and rest upon base 27. Base 27 may be bolted to a surface or left freestanding. In use, one may grasp the upper portion of the support post to stabilize the device, but in most instances this will not be necessary, as the direction of travel of the force to be exerted for compression is in a downward direction.

In preferred embodiments, especially for food service use, the device may be manufactured from stainless steel. Lower cost versions, suitable for domestic use, may be produced from high-impact plastics which may be injection molded or fabricated in other manners known in the art. Versions suitable for industrial applications may be manufactured from a wide variety of materials, including steel, aluminum, or a suitable plastic material. These examples serve only by way of example, and are not limitations. Versions are conceivable to those skilled in the art, in light of this invention, which may made of decorative hardwood for decorative kitchen implements, or decorative wood laminates. Furthermore, selected elements, or all elements, may be coated with rubber or a rubberized plastic to reduce scratching or impact and reduce noise of operation.

Other, less complex variants are also contemplated by this invention. Compression handle 12 may be a single transverse member across compression arms 13(a,b), and the spring may be omitted to simplify manufacture. Roller 18 may be omitted as well, replaced with guiding rails or support brackets.

To accommodate cans of varying sizes, inserts having "lips" may be inserted into the can engaging elements and held in place by the can engaging element lips. Additional blocks may be affixed to the can support plate to vary height quickly and conveniently. Thus, cans of smaller dimensions than the can support plate may be drained. Alternatively, those elements which are not essential for the pivoting action may be made adjustable on the can support plate to accommodate smaller cans without the need for a removable insert.

Additional elements, such as an attached catch basin for catching the fluids for use, are useful in kitchen and other applications. For example, the fluids accompanying pineapples in various sliced forms are high in nutritive value and of good taste. While these would not be desired in some cooking applications, it would be useful to obtain the juice for use as a beverage.

The foregoing Examples serve only to illustrate the invention, and not to limit it, as other variants and embodiments are readily discernable to one skilled in the art.

What is claimed is:

1. A device for compressing liquid from the contents of a pre-opened can and lid by exerting force upon the lid, comprising:
    a can support means including a can support plate having at least one can engaging element having a lip for engaging the can and lid, whereby a can and lid are held in place, said can support means being mounted to an inverting means to allow the can to be inverted and the draining of liquid from the pre-opened can, and
    a compression means which forcibly engages said lid, whereby compressive force may be applied to said lid to expel liquid from the interior of the can.

2. A device as claimed in claim 1, wherein said inverting means comprises a pivot allowing rotation of the can support means.

3. A device as claimed in claim 2, wherein said pivot is connected to a support bracket and comprises at least one can engaging member formed with an axle, and an axle receptacle formed on the support bracket.

4. A device as claimed in claim 1, said inverting means further comprising an inverting handle, which handle may be moved to invert said can and can support means to an inverted position, allowing fluid to drain from the can while solids are retained behind the lid.

5. A device as claimed in claim 1, wherein the can engaging element comprises an elongated element perpendicular to the can support plate and mounted on the plate, said element having a curvature.

6. A device as claimed in claim 1, wherein there are three can engaging elements.

7. A device as claimed in claim 1, wherein said compression means comprises a ram element which exerts force upon the can lid, whereby the contents of the can are compressed and liquid is expelled from the can interior.

8. A device as claimed in claim 7, wherein said ram element is guided by a roller.

9. A device as claimed in claim 1, wherein the device is manufactured from stainless steel.

10. A device as claimed in claim 1, wherein the device is manufactured from high-impact plastic.

11. A device as claimed in claim 1, wherein the device is manufactured from one of the group of wood and wood laminates.

12. A device for compressing liquid from the contents of a pre-opened can and lid by exerting force upon the lid, comprising:
    a can support means, whereby a can and lid are held in place, said can support means being mounted to an inverting means to allow the can to be inverted and the draining of liquid from the pre-opened can, and
    a compression means which forcibly engages said lid, whereby compressive force may be applied to said lid to expel liquid from the interior of the can, wherein said compression means comprises a ram element, said ram element being connected to a ram arm, which ram arm is in pivoting engagement with a pivotable compression arm having a grasping means.

13. A device for compressing liquid from the contents of a pre-opened can and lid by exerting force upon the lid, comprising:
    a can support means comprising a can support plate, and at least one can engaging element, said element having a lip for engaging the can and lid whereby a can and lid are held in place,
    said can support means being mounted to an inverting means,
    said inverting means comprising two can engaging elements formed with pivoting axles and an inverting handle fixedly connected to said can support means, said inverting means being pivotally connected to a support bracket formed with a circular axle receptacle, whereby motion of the inverting handle inverts the can support plate and can to allow for the draining of liquid from the pre-opened can, and
    a compression means which forcibly engages said can lid, comprising a ram element, said ram element being connected to a ram arm, which ram arm is in pivoting engagement with a pivotable compression arm having a grasping means, whereby compressive force may be applied to said lid to expel liquid from the interior of the can.

14. A device as claimed in claim 13, which is manufactured from stainless steel.

15. A device as claimed in claim 13, which is coated at least in part by a rubberized plastic material.

16. A device for compressing liquid from the contents of a pre-opened can and lid by exerting force upon the lid, consisting essentially of:

a can support means comprising a can support plate, and three can engaging elements, said elements each having a lip for engaging the can and lid whereby a can and lid are held in place, said can support means being mounted to an inverting means, said inverting means comprising two can engaging elements formed with pivoting axles, which pivotally engage a support bracket formed with axle receptacles, and an inverting handle mounted to said can support means, whereby motion of the inverting handle inverts the can support plate and can to allow for the draining of liquid from the pre-opened can, and a compression means which forcibly engages said lid, comprising a ram element having an end portion guided by a roller, said ram element being physically connected to a ram arm, which ram arm is in pivoting engagement with pivotable compressing arms, said compression arms pivoting about pivot points on an upper support bracket, said compression arms being connected to a handle, whereby compressive force may be applied to said lid to expel liquid from the interior of the can.

17. A device as claimed in claim 16, which is formed from stainless steel.

18. A device as claimed in claim 16, further comprising at least one spring to return the compression means to a non-compressed position, whereby can removal is facilitated.

* * * * *